United States Patent
Vandewall et al.

(10) Patent No.: US 10,991,138 B2
(45) Date of Patent: Apr. 27, 2021

(54) SYSTEMS AND METHODS FOR IN-FLIGHT VIRTUAL REALITY DISPLAYS FOR PASSENGER AND CREW ASSISTANCE

(71) Applicant: THE BOEING COMPANY, Chicago, IL (US)

(72) Inventors: Cynthia Anne Vandewall, Snohomish, WA (US); Andrew LeTourneau, Arlington Heights, IL (US); Ivan Thomas Klus, Cincinnati, OH (US); Jiakang Qi, Cincinnati, OH (US); Ming Tang, Mason, OH (US); Blake Lane, Cincinnati, OH (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/853,661

(22) Filed: Dec. 22, 2017

(65) Prior Publication Data

US 2019/0197748 A1    Jun. 27, 2019

(51) Int. Cl.
*G06T 11/60* (2006.01)
*G06F 3/0484* (2013.01)
(Continued)

(52) U.S. Cl.
CPC .......... *G06T 11/60* (2013.01); *B64D 11/0015* (2013.01); *G02B 27/017* (2013.01);
(Continued)

(58) Field of Classification Search
CPC ......... G06T 11/60; G06T 3/40; G06T 19/006; G06T 2207/30252; G06T 11/00;
(Continued)

(56) References Cited

U.S. PATENT DOCUMENTS

2011/0288768 A1*  11/2011  Stefani ............... G06Q 30/0281
                                                        701/533
2017/0146800 A1*  5/2017  Knight ............... G02B 27/0172
(Continued)

FOREIGN PATENT DOCUMENTS

GB          2532462 A      5/2016
WO      2016118344 A1      7/2016

OTHER PUBLICATIONS

Extended European Search Report for corresponding European Application No. 18204998.1, dated May 6, 2019 (9 pages).

*Primary Examiner* — Xilin Guo
(74) *Attorney, Agent, or Firm* — The Small Patent Law Group LLC; Joseph M. Butscher (57) ABSTRACT

An on-board virtual reality system is provided for use on-board a vehicle during a trip. The system includes a user input unit, a trip information input unit, a display unit, and a processing unit. The user input unit is configured to receive user input associated with a particular user. The trip information input unit is configured to acquire trip information corresponding to the trip. The display unit is configured to provide a virtual reality display to the user. The processing unit is configured to acquire the user input from the user input unit, acquire the trip information from the trip information input unit, generate a virtual reality display using the user input and the trip information, with the virtual reality display tailored for the particular user, and provide the virtual reality display to the particular user.

20 Claims, 7 Drawing Sheets

(51) Int. Cl.
*G02B 27/01* (2006.01)
*G06F 3/01* (2006.01)
*B64D 11/00* (2006.01)
*G06F 9/451* (2018.01)
*G06F 21/31* (2013.01)
*G06T 3/40* (2006.01)
*G06T 19/00* (2011.01)

(52) U.S. Cl.
CPC .......... *G06F 3/011* (2013.01); *G06F 3/04842* (2013.01); *G06F 9/453* (2018.02); *G06F 21/31* (2013.01); *G06T 3/40* (2013.01); *G06T 19/006* (2013.01)

(58) Field of Classification Search
CPC ..... G06T 7/11; G06T 7/50; G06T 2207/3025; G06F 9/453; G06F 21/31; G06F 16/9535; G06F 3/04842; G06F 3/04847; G06F 16/2462; G06F 16/972; G06F 16/954; G06F 21/602; G06F 3/0481; G06F 3/011; G06F 3/0482; G06F 3/012; G06F 3/147; G06F 3/04815; G06F 3/04886; G06Q 10/02; G06Q 30/0643; G06K 9/00671; G06K 9/00791; G06K 9/3233
See application file for complete search history.

(56) References Cited

U.S. PATENT DOCUMENTS

| | | | |
|---|---|---|---|
| 2017/0182957 A1* | 6/2017 | Watson | B60N 2/90 |
| 2017/0263056 A1* | 9/2017 | Leppanen | G06F 3/04895 |
| 2017/0301145 A1* | 10/2017 | Miller | G06F 1/163 |
| 2018/0181919 A1* | 6/2018 | Jobling | G06Q 10/025 |
| 2018/0261186 A1* | 9/2018 | Watson | G09G 5/006 |
| 2019/0319902 A1 | 10/2019 | Kao et al. | |

* cited by examiner

SYSTEMS AND METHODS FOR IN-FLIGHT VIRTUAL REALITY DISPLAYS FOR PASSENGER AND CREW ASSISTANCE

FIELD OF EMBODIMENTS OF THE DISCLOSURE

Embodiments of the present disclosure generally relate to systems and methods that utilize virtual reality to assist crew members and/or improve customer service, safety, and/or convenience during a trip performed by a vehicle.

BACKGROUND OF THE DISCLOSURE

A vehicle (such as an aircraft) may be used to transport a number of passengers as part of a trip. During the trip, it may be desirable to provide passengers and/or crew members with information and/or services. For example, various entertainment and/or food service options may be provided to passengers. Also, information pertaining to safety features and/or safety procedures may be provided to customers. Further, information pertaining to connecting flights or other aspects of passenger itineraries may be provided. However, current approaches are limited in the amount of information available and the convenience of accessing the information.

SUMMARY OF THE DISCLOSURE

Accordingly, improved display of information and/or services to passengers and/or crew members during a trip is provided in various embodiments disclosed herein.

Certain embodiments of the present disclosure provide a virtual reality system for use on-board a vehicle during a trip of the vehicle. The vehicle includes a cabin. The system includes a user input unit, a trip information input unit, a display unit, and a processing unit. The user input unit is configured to receive user input from a user, with the user input associated with a particular user. The trip information input unit is configured to acquire trip information corresponding to the trip. The display unit is configured to provide a virtual reality display to the user. The processing unit is coupled to the user input unit, the trip information input unit, and the display unit, and is configured to acquire the user input from the user input unit, acquire the trip information from the trip information input unit, generate a virtual reality display using the user input and the trip information, with the virtual reality display tailored for the particular user associated with the user input, and provide the virtual reality display to the particular user with the display unit.

Certain embodiments of the present disclosure provide a method for displaying virtual reality content on-board a vehicle during a trip of the vehicle that includes a cabin. The method includes acquiring user input from a user. The user input is associated with a particular user. The method also includes acquiring trip information corresponding to the trip. Also, the method includes generating, with one or more processors, a virtual reality display using the user input and the trip information. The virtual reality display is tailored for the particular used associated with the user input. Further, the method includes providing the virtual reality display to the particular user.

Certain embodiments of the present disclosure provide a tangible and non-transitory computer readable medium that includes one or more computer software modules. The computer software modules are configured to direct one or more processors to acquire user input associated with a particular user on-board a vehicle performing a trip; acquire trip information to the trip; generate a virtual reality display using the user input and the trip information, the virtual reality display tailored for the particular used associated with the user input, and display the virtual reality display to the particular user.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods for providing virtual reality displays to passengers and/or crew members of a vehicle during a trip (e.g., during a flight of an aircraft). It may be noted that as used herein, unless expressly stated otherwise, the term virtual reality display need not be limited to virtual reality content exclusively, but, for example, also encompasses augmented reality displays and/or mixed reality displays. The displays generated and provided by various embodiments herein may be viewed, for example, through a headset or other head-mounted display. In various embodiments, the virtual reality display may include a virtual assistant. Various embodiments provide users with information, entertainment options, and communication between crew members and passengers. Further, various embodiments provide passengers with a more personal travel experience, providing personalized information in a private manner (e.g., through a display generated for the particular user and displayed exclusively on a headset worn by the particular user). Displays may be personalized or tailored based on the individual viewing the display and/or based on the location within the vehicle at which the display is provided. Various embodiments provide virtual reality displays in 3D (e.g., as one or more 3D overlays).

Various embodiments provide a virtual reality interface allowing users to have a private screen or workspace with which to perform a variety of tasks. For example, users may look up information about their flight or other trip, airport or other transportation station, destination location, or connections. Further, various embodiments provide improved safety demonstrations, for example that match or supplement the safety equipment and instructions otherwise provided. For example, if a presentation regarding emergency exits is presented to a group of passengers as a whole, an individual passenger may use a virtual reality interface to highlight the closest exit (or group of exits), and/or highlight one or more exit paths.

Figure 1:
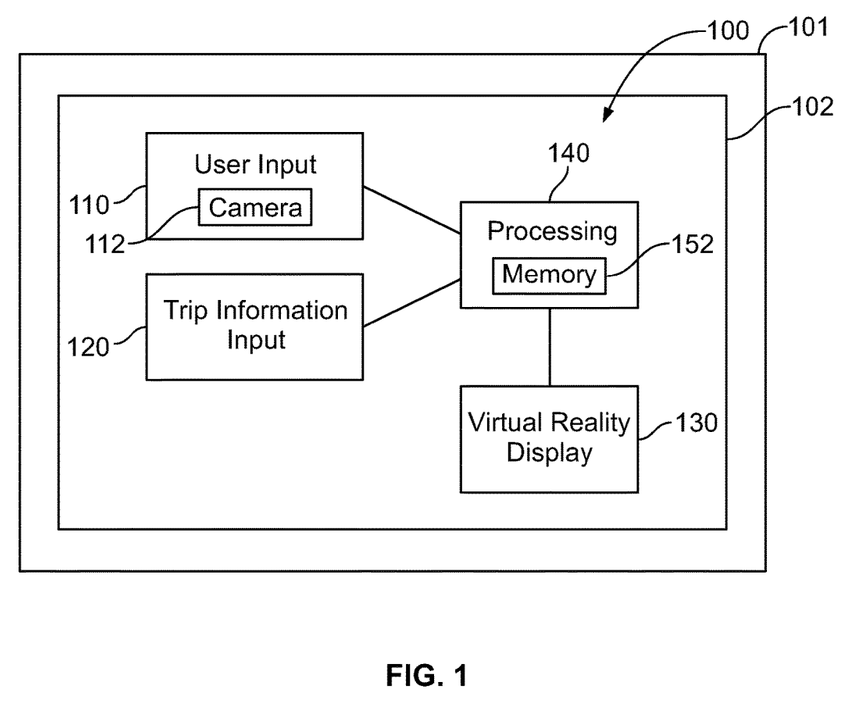
FIG. 1 provides a schematic block diagram of an on-board virtual reality system, according to an embodiment of the present disclosure.

FIG. 1 provides a schematic view of a virtual reality system 100.

The system 100 is generally configured to perform various tasks, for example, to assist a flight crew and/or one or more passengers during a flight of an aircraft. The depicted virtual reality system 100 is configured to be used on-board a vehicle during use of the vehicle (e.g., during a trip performed with the vehicle). While the virtual reality system 100 of the illustrated embodiment is configured to be used on-board an aircraft 101 during a flight, it may be noted that the aircraft 101 is an example of a vehicle with which the virtual reality system 100 may be used. In alternate embodiments, the virtual reality system 100 may be used in connection with a different vehicle, such as a ship or other water craft, or, as another example, in connection with a land-based vehicle such as a bus or train. As seen in FIG. 1, the aircraft 101 includes a cabin 102, which includes an area for seating of passengers and/or crew.

As seen in FIG. 1, the depicted virtual reality system 100 includes a user input unit 110, a trip information input unit 120, a virtual reality display unit 130, and processing unit 140. Generally, the user input unit 110 receives user input from one or more users (e.g., crew members, passengers), and the trip information input unit 120 acquires trip information (e.g., from one or more servers, networks, or other computer systems disposed on-board the vehicle and/or off-board the vehicle). The processing unit 140 is operably coupled to the user input unit 110, the trip information input unit 120, and the virtual reality display unit 130. The processing unit 140 acquires the user input from the user input unit and the trip information from the trip information input unit, and generates a virtual reality display using the user input and the trip information input unit. The virtual reality display in various embodiments is generated and/or modified or updated responsive to the user input. In various embodiments, the virtual reality display is tailored for the particular user(s) associated with the user input. The processing unit 140 then provides the virtual reality display to the user(s) via the virtual reality display unit 130.

As discussed above, the depicted user input unit 110 is configured to receive user input from a user. The user, for example, may be a passenger onboard a vehicle during a trip (e.g., a passenger on-board the aircraft 101 during a flight). The user, as another example, may be a crew member onboard the vehicle during the trip. In various embodiments the user input is associated with the particular user.

The user input unit 110 in various embodiments includes a camera 112. The camera 112, for example, may be worn by a user, and oriented toward a field of view corresponding to the orientation of the user's head, for example to acquire images in a field of view of the user. The user input unit 110 may also include physical input units such as a keyboard, touchscreen, or mouse.

User input may also be provided virtually. In some embodiments, the user input unit 110 may also share one or more components with the virtual reality display unit 130. For example, a screen used to display a virtual reality display may include portions that may be utilized to provide user input. The camera 112 may be used in conjunction with the virtual reality display to provide user input. For example, the camera may collect images of a user's hands that are used in connection with a virtual display to provide user input. Various hand motions (e.g., touching, pinching, swiping, or the like) may be used in connection with portions of a virtual reality display to provide user input.

As discussed herein, the user input is associated with a particular user. The input may be associated with the user via the user input unit 110. For example, the user input unit 110 may be part of a headset that also displays virtual reality displays generated by the processing unit 140, and the display provided to a particular headset may be generated using a camera or other input of the particular headset. Additionally or alternatively, the user input unit 110 may be associated with a particular user by a predetermined assignment or authentication, so that input acquired from a particular user input unit 110 is associated with the particular user. For example, a user input unit 110 may be registered as being associated with a particular passenger or crew member. As another example, the user input may be associated with a particular user using visual information (e.g., acquired by the camera 112). By comparing a view from the camera 112 with known views of the cabin 102, or by using predetermined fiducial markers, the location (e.g., seat number) from which a view provided by the user input unit may be determined and used to associate the input with a particular user.

It may be noted that, in various embodiments, the processing unit 140 is configured to authenticate the particular user. For example, before input from the user input unit 110 is utilized by the processing unit 140 and/or before the processing unit 140 provides a virtual reality display to the virtual reality display unit 130, a user may be required to provide a password, authorization code, or other information for authentication. Biometric input (e.g., facial recognition, retinal scan, or the like) may be utilized in various embodiments. Use of authentication in various embodiments helps to eliminate or reduce inaccurate or inappropriate use of displays, and help ensure that information is provided to the intended user.

The depicted trip information input unit 120 is configured to acquire trip information corresponding to the trip. Generally, the trip information is used in conjunction with the user input by the processing unit 140 to generate a virtual reality display for the user. The depicted trip information input unit 120 in various embodiments includes one or more components configured to communicably couple the processing unit 140 with one or more sources of trip information. The sources of trip information may be disposed on-board the aircraft 101 (e.g., a server disposed within the cabin 102), or off-board the aircraft 101 (e.g., a ground-based source of information). Trip information may also be manually input or otherwise entered by crew and/or passengers. For example, the trip information input unit 120 may communicably couple the processing unit 120 with other computing or communication systems or sub-systems on-board the aircraft 101. Communicably coupling the processing unit 140 with on-board and/or off-board systems or sub-systems increases the connectivity of the virtual reality system 100 and/or the cabin 102, allowing for a "connected cabin," and allowing the virtual reality system 100 to utilize information from a variety of sources for convenient, efficient, and reliable operation as well as providing for consistency or seamlessness of actions performed by the virtual reality system 100 with actions taken by other systems or subsystems of the aircraft 101.

The trip information input unit 120 may provide for hard-wiring of the processing unit 140 to an on-board source of information. The trip information input unit 120 may also provide for wireless communication with on-board and/or off-board sources of information. In various embodiments, the trip information input unit 120 is configured to acquire at least a portion of the trip information from a source disposed off-board the vehicle. For example, a trip information input unit 120 disposed on-board an aircraft during a flight may acquire trip information from the ground and/or other aircraft, providing for access to more information and/or services. The trip information input unit 120 may include one or more of a modem, antenna, or wireless communication system, for example. It may be noted that trip information may also be provided via one or more cameras or other detectors or sensors configured to measure or detect one or more aspects of the environment within the cabin 102. In addition to sensors for atmospheric conditions (e.g., temperature), for example, the trip information input unit 120 may include one or more cameras or other sensors for determining the amount of space available in particular overhead bins. As another example, the trip information input unit 120 may include one or more proximity sensors for determining if a portion of the cabin 102 (e.g., lavatory) is occupied or not.

The trip information in various embodiments includes information about the particular vehicle, the route being travelled, the passengers on-board the vehicle, the crew on-board the vehicle, locations associated with the vehicle (e.g., airports, train stations, or other arrival and departure points), and/or other trips (e.g., connecting flights for one or more passengers on-board an aircraft). For example, information about the particular vehicle may describe or correspond to the capabilities or design of the vehicle, including the layout of the seats and aisles and exit routes, and/or safety features. Information about the route being travelled may describe or correspond to the status of the trip, schedule of the trip, destinations along the trip, points of general interest along the trip, services available during the trip (e.g., entertainment options, food and/or drink service), and/or safety procedures relevant to the trip. Information about the passengers and/or crew on-board the vehicle may describe or correspond to the identity and/or seat locations of particular passengers, the identity and/or responsibilities of crew members on-board the vehicle, and/or passenger service information (e.g., food/drink orders, entertainment utilized or requested by the passenger, information regarding the baggage of the passenger such as pick-up location, connecting flights relevant to one or more passengers). Generally, the trip information may be utilized in connection with scheduling, entertainment, food and/or drink service, safety features, or providing general information.

It may be noted that the trip information may include general information not associated with a particular user, and/or may include information corresponding to or particularly relevant to a particular user. For example, the trip information may include general information regarding the plane (or other vehicle) layout and user-specific information regarding a particular seat or overhead bin associated with a user. As another the trip information may include general information describing available food choices, and user-specific information describing past user choices or preferences to help guide food selection. As one more example, the trip information may include general information describing available choices for movies, games, or other entertainment, and user-specific information describing past user choices or preferences to help guide entertainment selection. As an additional example, the trip information may include general information regarding safety features of the vehicle, as well as user-specific information corresponding to safety features of a particular seat or area of the vehicle, and/or any special conditions (e.g., mobility or other health limitation) of a given passenger or passengers. As an example regarding scheduling information, the trip information may include general information corresponding to a current trip status (e.g., status (on-time or delayed) of current trip being performed, estimated arrival time of current trip being performed), and also include user-specific information corresponding to connecting flights of a particular passenger (or passengers) on-board a current flight.

The depicted virtual reality display unit 130 is configured to provide a virtual reality display to the user. A virtual reality display as used herein may be understood as including digital content or computer-generated simulations of a three-dimensional image or environment that can be interacted with in a seemingly real or physical way by a person (e.g., using special electronic equipment). It may be noted that the display need not necessarily be limited to virtual reality, but also may include augmented reality or mixed reality. For example, the display may include portions corresponding to the physical surroundings of the user (e.g., images provided via camera 112), and/or may include additional or supplemental digital content such as selection menus, informational blocks, or the like.

It may also be noted that, while the user input unit 110 and the virtual reality display unit 130 are depicted as separate entities in the schematic block diagram of FIG. 1, the user input unit 110 and the virtual reality display unit 130 (or aspects thereof) may be incorporated into a single physical entity, and/or be used in connection with each other. For example, the virtual reality display provided via the virtual reality display unit 130 may include one or more portions that a user may interact with using hand motions to provide user input.

Figure 2:
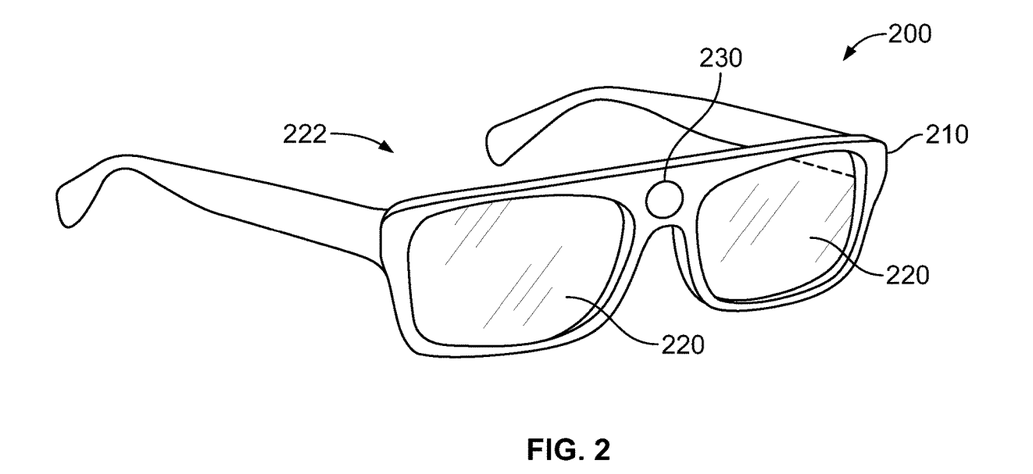
FIG. 2 illustrates an example headset, according to an embodiment of the present disclosure.

In some embodiments, the user input unit 110 and the virtual reality display unit 130 are mounted to a common structure or otherwise physically incorporated with each other. For example, the user input unit 110 and the virtual reality display unit 130 in some embodiments may be mounted to a headset. The headset may be assigned to a particular user, and input provided via the headset associated with that particular user and/or virtual reality displays tailored for that particular user provided to the headset. FIG. 2 illustrates a headset 200 formed in accordance with an embodiment. The headset 200, or aspects thereof, may form a portion of the virtual reality system 100. For example, the headset 200 may incorporate or represent aspects of the user input unit 110 and the virtual reality display unit 130. As seen in FIG. 2, the depicted headset 200 includes a frame 210, lenses 220, and a camera 230. The frame 210 of the illustrated embodiment is configured to be worn by a user, and to orient the camera 230 toward a field of view corresponding to the user's field of view (e.g., corresponding to a field of view that would be observed by the user if the headset 200 were removed from the user). In various embodiments, the headset 200 may include headphones or speakers that are mounted to or associated with the frame 210 to provide sound along a virtual reality display. The headset 200 also includes two lenses 220. The interior portion 222 of the lenses 220 are configured as screens on which virtual reality displays generated by the processing unit may be displayed. The headset 200 may be assigned to or otherwise registered to a particular user to accurately identify the particular user who is the source of user input information from the headset 200 as well as to provide the appropriate virtual reality display to the intended user.

Returning to FIG. 1, the depicted processing unit 140 is operably coupled to the user input unit 110, the trip information input unit 120, and the virtual reality display unit 130. In various embodiments, for example, the processing unit 140 acquires user input from the user input unit 110, and acquires trip information from the trip information input unit 120. The processing unit 140 generates a virtual reality display using the user input and the trip information. The virtual reality display generated by the depicted processing unit 140 is tailored for the particular user associated with the user input. After generating the virtual reality display, the processing unit 140 provides the virtual reality display to the particular user via the virtual reality display unit 130. For example, using the user input from a given, identified user, the processing unit 140 may generate a unique virtual reality display, and provide that unique virtual reality display to the identified user via a virtual reality display unit 130 associated with the given, identified user.

It may be noted that, in various embodiments, the processing unit 140 includes processing circuitry configured to perform one or more tasks, functions, or steps discussed herein. It may be noted that "processing unit" as used herein is not intended to necessarily be limited to a single processor or computer. For example, the processing unit 140 may include multiple processors and/or computers, which may be integrated in a common housing or unit, or which may be distributed among various units or housings. In various embodiments, the processing unit 140 (or a portion thereof) may be located local to the particular user (e.g., as part of an integrated unit with the user input unit 110 and/or the virtual reality display unit 130 such as headset 200), away from the user but on-board the vehicle (e.g., as part of a server or other computing system disposed within the cabin 102), and/or located off-board the vehicle (e.g., at a ground based system, with the user on-board the aircraft 101 during a flight). It may be noted that operations performed by the processing unit 140 (e.g., operations corresponding to process flows or methods discussed herein, or aspects thereof) may be sufficiently complex that the operations may not be performed by a human being within a reasonable time period. In the illustrated embodiment, the processing unit includes a memory 152. The memory 152 may include one or more computer readable storage media. For example, the process flows and/or flowcharts discussed herein (or aspects thereof) may represent one or more sets of instructions that are stored in the memory 152 for direction of operations of the processing unit 140 and virtual reality system 100.

As discussed herein, the processing unit 140 in various embodiments utilizes user input along with flight information to generate a virtual reality display tailored for a particular user. For example, the processing unit may use trip information for background information, as source information, or as an initial point to begin interaction with a user, and utilize user input for additional context and/or to tailor or target the display for the user. For example, the processing unit 140 may autonomously provide a prompt to one or more users (e.g., via a pop-up caption, menu, or block on a virtual reality display) regarding available food or drink options. A given user may then interact with a menu or other display feature to provide user input regarding food or drink selection process, with the processing unit 140 updating the display responsive to the user input. For instance, when a user selects an item, nutritional or other descriptive information may be displayed, or an order may be placed responsive to user input. The virtual reality display may also display status information regarding arrival times or other flight status, information regarding any changes to a user's itinerary including connecting flights, safety information, or the like.

As discussed herein, the information may be tailored for a particular user based on a known identity of the user, a request of a user, and/or a location of the user. For example, when the user input of a crew member corresponds to a location in a galley, the display may include portions corresponding to crew functions typically performed in the galley. When the user input of crew member corresponds to a location in the passenger seating area, the display may include portions corresponding to crew functions typically performed the passenger seating area.

As another example, the virtual reality display may be tailored based on seating location. For example, a safety related display may be tailored to depict exit routes or safety features customized for a particular seat or group of seats based on the location of the seat or group of seats relative to different exit routes. As another example, information of general interest may be customized based on location. In one example scenario, when an aircraft passes over different landscape features (e.g., bodies of water, mountains, cities, places of historical interest) that are visible on opposite sides of the aircraft, passengers at windows on one side of the plane may be provided with a display including information pertinent to landscape features visible from the windows on that side of the aircraft, while passengers at windows on the opposite side of the plane may be provided with a display including information pertinent to the different landscape features visible from the windows on their side of the aircraft.

Service or convenience information may also be customized or tailored for particular users. For example, for a user looking for overhead storage room, particular overhead bins in the field of view of a camera 112 for a particular user may be displayed, along with descriptions or depictions of the available space within the bins (e.g., as determined using information from sensors or cameras associated with the bins). As another example, information regarding a connecting flight, for example a change in time of departure of a connecting flight, may be displayed only to relevant users (e.g., users scheduled to be on the connecting flight).

It may be noted that virtual reality displays discussed herein may be generated responsive to user requests, and/or initiated autonomously. For example, when trip information (and/or an input provided by a crew member) indicates that safety information is being presented, the processing unit 140 may generate a display including safety-related information, demonstrations, or options to a user. As another example, when trip information indicates that food or drink service becomes available, the processing unit 140 may generate a display describing or depicting available food or drink options.

Figure 3:
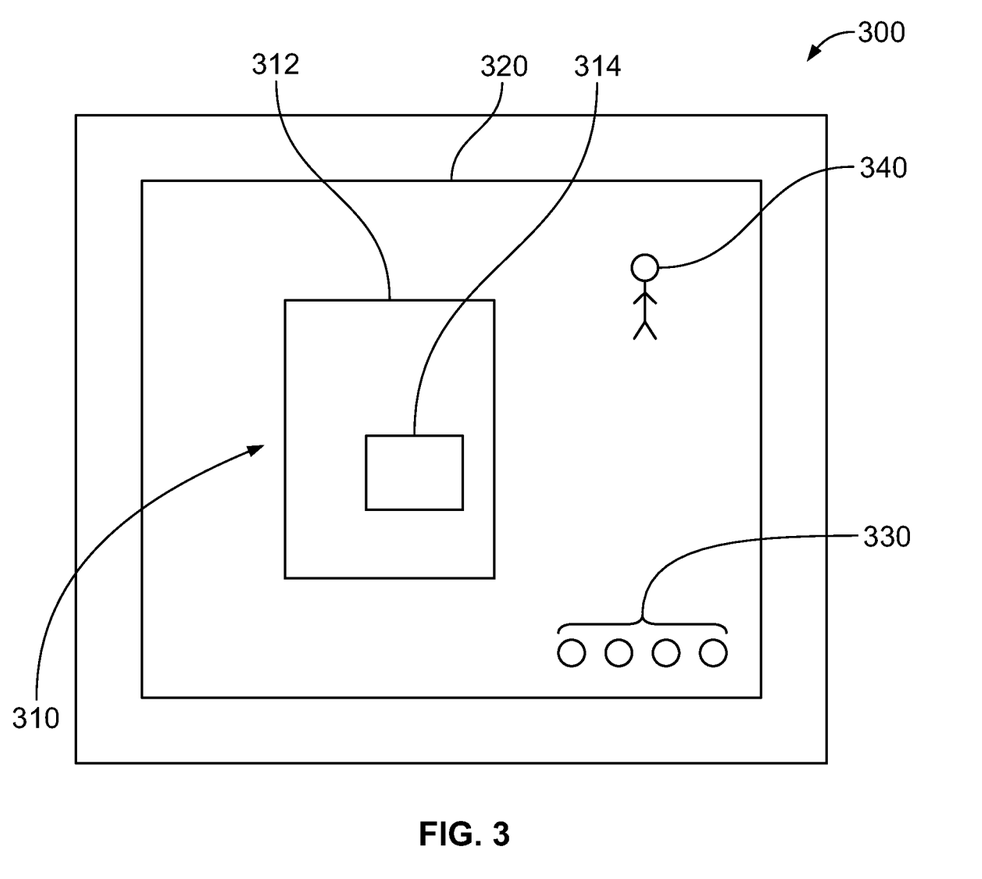
FIG. 3 provides a schematic block diagram of an example display, according to an embodiment of the present disclosure.

In some embodiments, the virtual reality display generated by the processing unit 140 and displayed via the virtual reality display unit 130 is a mixed display that includes a digital portion and an environmental portion. FIG. 3 provides a schematic block view of a mixed display 300 that has a digital portion 310 and an environmental portion 320. The environmental portion corresponds to an environment within the cabin (e.g., cabin 102) proximate to the particular user providing the user input. The display 300, for example, may be generated by the processing unit 140 and provided to a user via the virtual reality display unit 130.

As seen in FIG. 3, the digital portion 310 is super-imposed upon or displayed over a portion of the environmental portion 320. In various embodiments, the environmental portion 320 may replicate or simulate the field of view of a user wearing a headset (e.g., headset 200), and the digital portion 310 may provide digital content superimposed over the environmental portion 320. For example, the environmental portion 320 may correspond to the current field of view of the user, and the digital portion 310 may simulate an action or activity. For example, the digital portion 310 may be utilized in connection with a safety demonstration and simulate the appearance of an oxygen mask that has dropped from a ceiling for use, allowing the user to be familiar with the position at which the mask would be available in case of actual use. As another example, the digital portion 310 may highlight or simulate the location of convenience features within the field of view, such as the location of blankets or pillows, the availability of space in overhead compartments within the field of view, or the like.

As another example, the digital portion 310 may include information regarding food, drink, or entertainment options (e.g., as part of a menu offering user selections). The digital portion 310 in various embodiments provides for interactivity with a user. For example, a user may be able to select options from a menu displayed in the digital portion 310, with the selections resulting in either a modified display (e.g., displaying more information about a selection) or ordering a service (e.g., ordering food, a movie, or a game).

Figure 4:
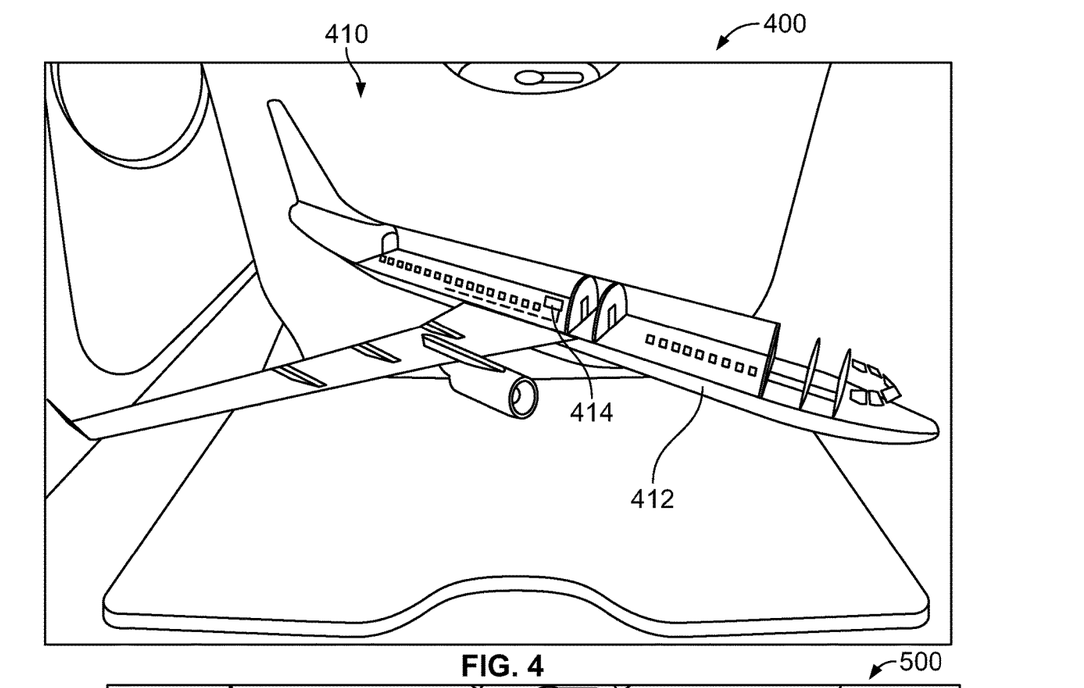
FIG. 4 illustrates an example display, according to an embodiment of the present disclosure.

In various embodiments the digital portion 310 includes a general portion 312 and a tailored portion 314. For example, the general portion 312 may include information relating to the vehicle or a portion thereof, and the tailored portion 314 may provide additional information regarding the vehicle of particular interest to the user. FIG. 4 illustrates an example display 400 including a general portion 412 and a tailored portion 414. As seen in FIG. 4, the general portion 412 is superimposed over an environmental portion 410. The environmental portion 410 in the illustrated embodiment depicts one or more trays, seat backs, or other structures within a field of view of a user seated in a passenger seat. The general portion 412 in FIG. 4 depicts a general layout of an aircraft in which a user is positioned. The tailored portion 414 depicts one or more emergency exits in the vicinity of the user. For example, based on a seat registered to the user, the processing unit 140 may determine the exits that are closest to the user, and highlight the exits as part of the tailored portion 414 superimposed on the general portion 412. Additionally or alternatively, for example, exit routes may also be included in the tailored portion 414 and highlighted or otherwise superimposed on the general portion 412. Accordingly, the display 400 can improve passenger safety by improving familiarity with exit routes or other safety features.

Figure 5:
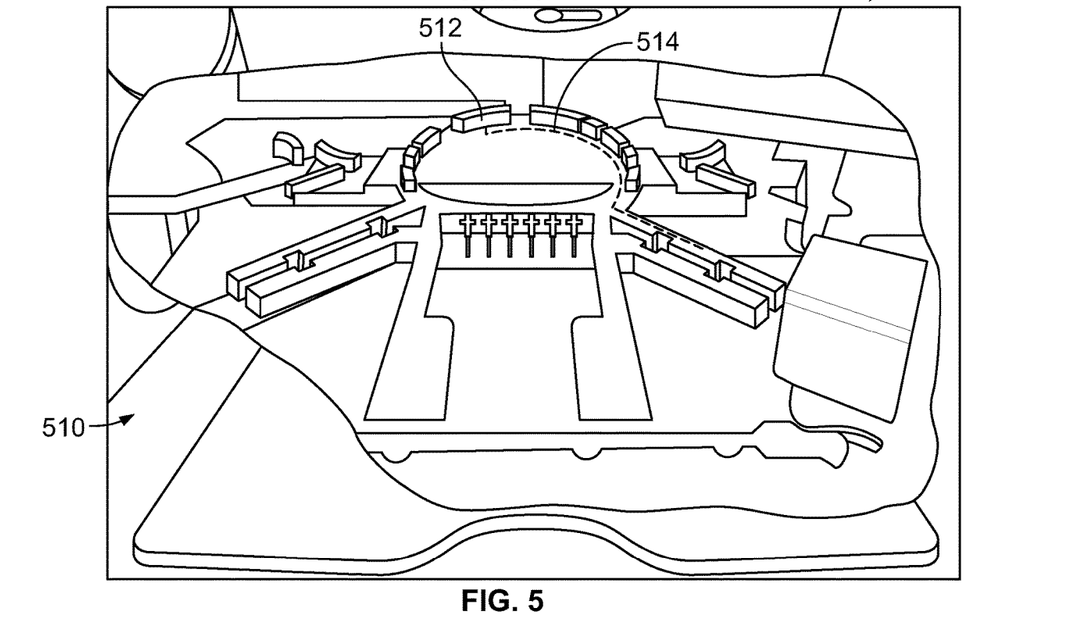
FIG. 5 illustrates an example display, according to an embodiment of the present disclosure.

Other structures or features may be displayed in various embodiments. For example, FIG. 5 illustrates an example display 500 including a general portion 512 and a tailored portion 514 that relate to an airport (e.g., an airport at which an aircraft in which the user is currently riding will arrive). As seen in FIG. 5, the general portion 512 is superimposed over an environmental portion 510. The environmental portion 510 in the illustrated embodiment includes one or more trays, seat backs, or other structures within a field of view of a user seated in a passenger seat. The general portion 512 in FIG. 5 depicts a general layout of a portion of an airport at which the user is scheduled to arrive. The tailored portion 514 depicts a route (e.g., a route to a baggage claim area and/or connecting flight terminal) to be taken by the user after arrival at the airport. For example, based on a known itinerary of the user, the processing unit 140 may determine the route or routes through the airport that are pertinent to the user, and highlight the route(s) as part of the tailored portion 514 superimposed on the general portion 512. The display 500 may be displayed responsive to a user request. Additionally or alternatively, the display 500 may be displayed autonomously. For example, if a change in the terminal for connecting flight is indicated by the trip information, the processing unit 140 can provide the display 500 to pertinent passengers responsive to the change. Accordingly, the display 500 can improve passenger convenience by assisting in navigation through the airport upon arrival.

It may be noted that the display generated by the processing unit 140 and displayed by the virtual reality display unit 130 may be used by a crew member in various embodiments. For example, in some embodiments, the virtual reality display is configured for a crew member, and includes a passenger information display portion corresponding to passenger inputs provided by corresponding passengers of the vehicle. For example, the passengers may have separate corresponding input units 110 through which information about the passenger (identity, food/drink/entertainment order, trip itinerary, mobility limitations or other health information) is provided, and the crew member may be provided with a display that utilizes the passenger information as provided via the input units. Additionally or alternatively, information about passengers may be included as part of trip information used to generate a display for a crew member.

Figure 6:
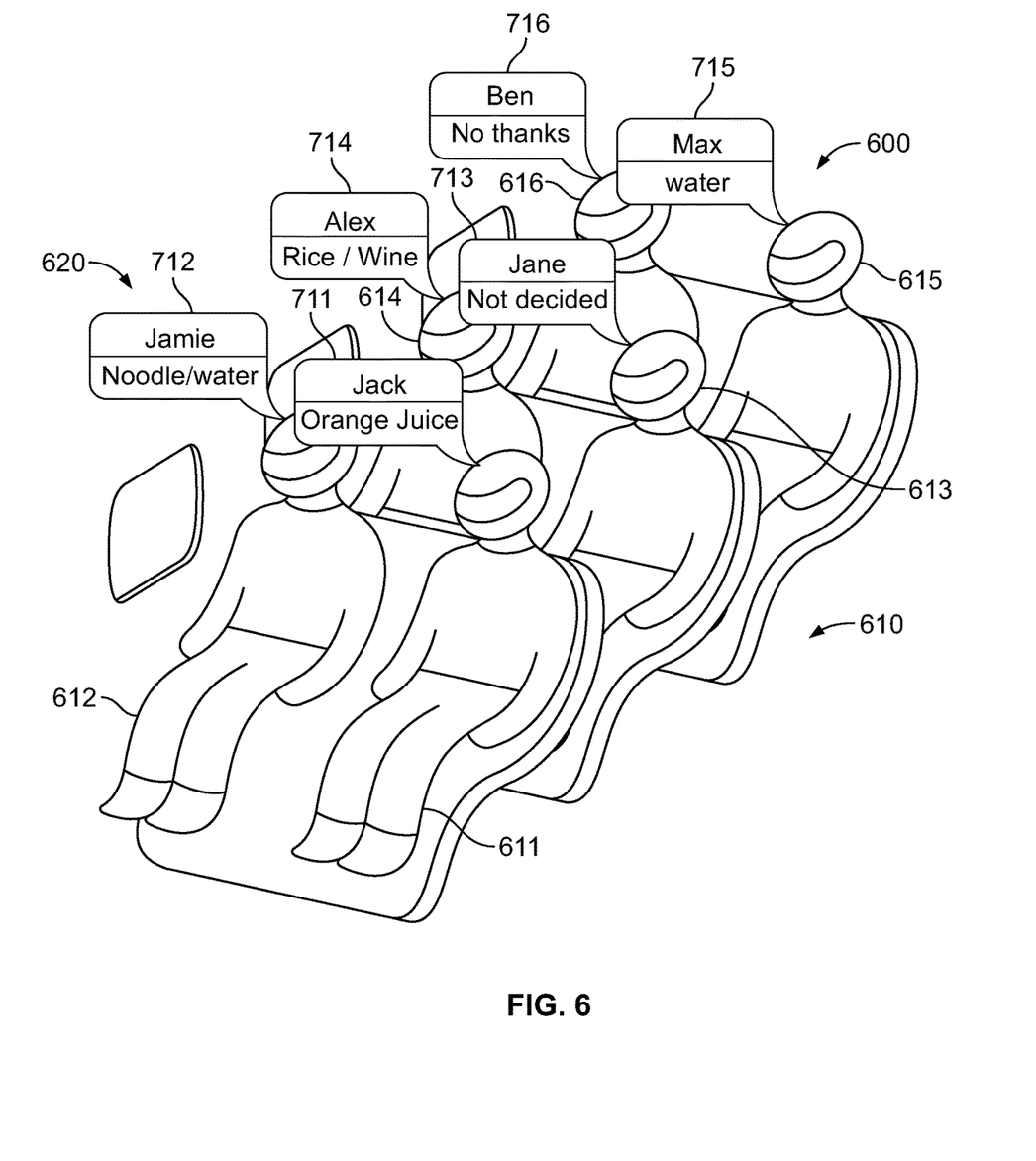
FIG. 6 illustrates an example display, according to an embodiment of embodiment of the present disclosure.

FIG. 6 illustrates an example display 600 that may be generated by the processing unit 140 and configured for use by a crew member. The display 600 includes a background portion 610 and an informational portion 620. In the illustrated embodiment, the background portion 610 corresponds to a view of a crew member in an aisle of a vehicle (e.g., as provided by camera 112), and includes passenger representations 611, 612, 613, 614, 615, 616 corresponding to passengers in the view of the crew member. The information portion 620 includes added digital content including information about each passenger associated with each passenger. In the illustrated embodiment, each passenger representation has associated therewith an informational caption. Namely, informational caption 711 is associated with passenger 611 and displays information about passenger 611, informational caption 712 is associated with passenger 612 and displays information about passenger 612, informational caption 713 is associated with passenger 613 and displays information about passenger 613, informational caption 714 is associated with passenger 614 and displays information about passenger 614, informational caption 715 is associated with passenger 615 and displays information about passenger 615, and informational caption 716 is associated with passenger 616 and displays information about passenger 616. In the illustrated embodiment, passenger name and food/drink order is displayed; however, it may be noted that additional or alternate information may be displayed in other embodiments. Accordingly, in various embodiments, the processing unit 140 is configured to provide a display using inputs from multiple users to provide a display to one user (e.g., a crew member).

Returning to FIG. 3, it may be noted that the depicted display 300 also includes various features configured to provide interactivity with a user. For example, the display 300 includes virtual buttons 330 that may be used by a user to provide input. For example, a user may extend a finger into a portion of the field of view of a camera (e.g., camera 112) corresponding to a virtual button 330 to provide input. In some embodiments, the processing unit 140 is configured to generate a virtual assistant as part of a virtual reality display. The virtual assistant is configured to provide interaction with the particular user. For example, the virtual assistant may, under the direction of the processing unit 140, offer assistance to the user, receive a request from the user, provide information from the user, or otherwise interact with the user.

The display of FIG. 3 includes a virtual assistant 340. The virtual assistant 340 may be associated with information or used to provide information to the user either audibly (e.g., through a speaker) or visibly (e.g., through a written caption). Further, the position of the virtual assistant 340 may be controlled to be at a pertinent location of the display (e.g., nearby a portion or aspect of the display that is of particular interest). In one example scenario, during a safety instruction interaction where exits of an aircraft are displayed, the personal assistant 340 may be positioned at an exit and/or move along an exit route toward an exit, while providing audible or visual information about the exit route and/or exit. It may be noted that the personal assistant 340 may be added to a display and/or controlled within the display autonomously and/or under user direction or responsive to a user request. For example, during a time of the flight at which food or entertainment options are to be provided, the virtual assistant 340 may be autonomously provided on the display 300 to display information regarding available options to a user. After providing available options to the user, a selection and/or question may be received from the user via the virtual assistant 340. Then, additional information or further selection options may be provided to the user responsive to the selection or question. Accordingly, the virtual assistant 340 in various embodiments conveniently facilitates interaction with the user. It may be noted that, additionally or alternatively, other portions of the display may also be interacted with via hand motions.

It may further be noted that the environmental portion 310 may be an actual image of the physical surroundings (e.g., within a field of view of camera 112), or a virtual reality representation of the physical surroundings. In some embodiments, the environmental portion 310 may be adjusted to alter one or more aspects of its appearance from the environment that it is based one. For example, in some embodiments, the processing unit 140 is configured to adjust an apparent size of the environmental portion 310 of the virtual reality display 300. For example, the apparent size of the portion surrounding the user may be enlarged, which may help the user feel less cramped or constrained within a confined space of the vehicle.

Figure 7:
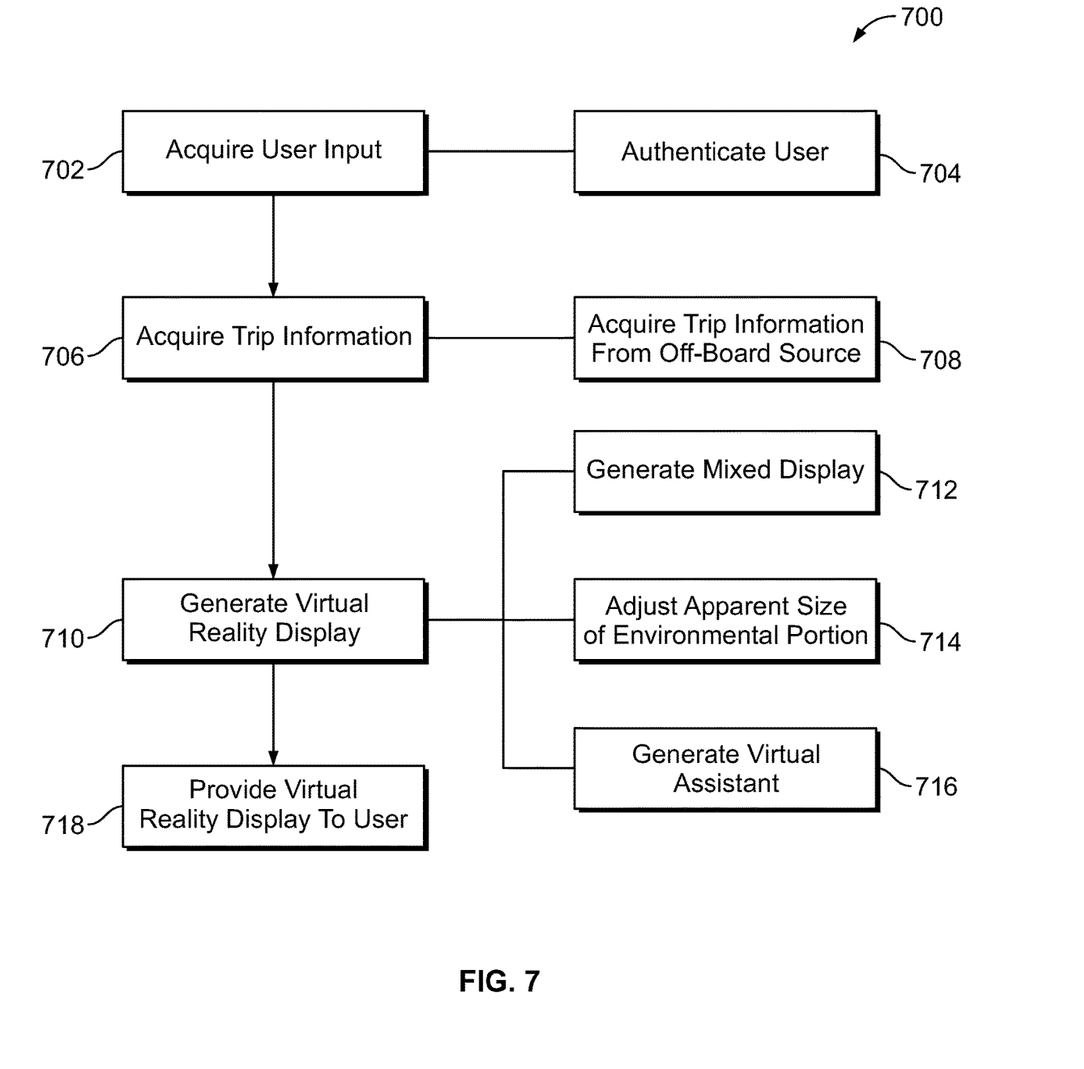
FIG. 7 provides a flowchart of a method, according to an embodiment of the present disclosure.

FIG. 7 provides a flowchart of a method 700 for displaying virtual reality content on-board a vehicle (e.g., aircraft) during a trip (e.g., flight), in accordance with various embodiments. For example, the vehicle may include a cabin in which passenger and/or flight crew are positioned, and may display the virtual reality content to one or more passengers and/or crew members. The method 700, for example, may employ or be performed by structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 700 may be able to be used as one or more algorithms to direct hardware (e.g., one or more aspects of the processing unit 140) to perform one or more operations described herein.

At 702, a user input is acquired from a user, with the user input associated with a particular user. Users in various embodiments may include passengers and/or crew members. For example, user input may be obtained from a passenger utilizing a user input unit, such as user input unit 110 or headset 200. The user input may be acquired by a processing unit via one or more of a camera, interactive display, or keyboard or touchscreen. The user input in various embodiments may uniquely identify a user, for example by name and/or seat location. In the illustrated embodiment, at 704, the particular user is authenticated. Authentication of a user in various embodiments help ensure that users receive appropriate, accurate displays. For example, authentication of crew members may help prevent information pertinent only to crew members from being received by passengers, or authentication of individual passengers may help ensure that information relating to, for example, itinerary or connecting flights, is displayed to the appropriate passenger.

At 706, trip information for the trip is acquired. The trip information may be acquired using a trip information input unit (e.g., trip information input unit 120) as discussed herein. Generally, as also discussed elsewhere herein, the trip information may include one or more of information about the vehicle, information about the trip (e.g., available food or entertainment choices), information about the route, information about other trips (e.g., connecting flights), information about passengers or crew, or information about a destination, for example. In the depicted embodiment, at 708, at least a portion of the trip information is acquired from a source disposed off-board the vehicle. Acquiring information from off-board the vehicle in various embodiments provides enhanced informational resources, providing more options and/or improving services for passengers and/or crew.

At 710, a virtual reality display is generated (e.g., by one or more processors such as processing unit 140 discussed herein) using the user input and the trip information. The virtual reality display is tailored for a particular user associated with the user input. In various embodiments, the virtual reality displays may include one or more aspects discussed herein in connection with FIGS. 1-6.

In the illustrated embodiment, at 712 a mixed display (e.g., display 300) is generated that includes a virtual reality portion and an environmental portion. The environmental portion corresponds to an environment within the cabin proximate to the particular user providing the user input. At 714 of the depicted example, the apparent size of the environmental portion of the virtual reality display is adjusted. For example, the apparent size of a user's surroundings may be adjusted to appear larger to improve the user's sense of comfort. At 716, a virtual assistant is generated as part of the virtual reality display. The virtual assistant interacts with the user to provide information to the user and/or to acquire information from the user.

At 718, the virtual reality display is provided to the particular user associated with the user input. For example, the virtual reality display may be communicated to and displayed by a display unit (e.g., virtual reality display unit 130 or headset 200). In various embodiments, the virtual reality display unit may be physically incorporated with the input unit from which the user input associated with the particular user is acquired (e.g., as part of a headset such as headset 200).

Figure 8:
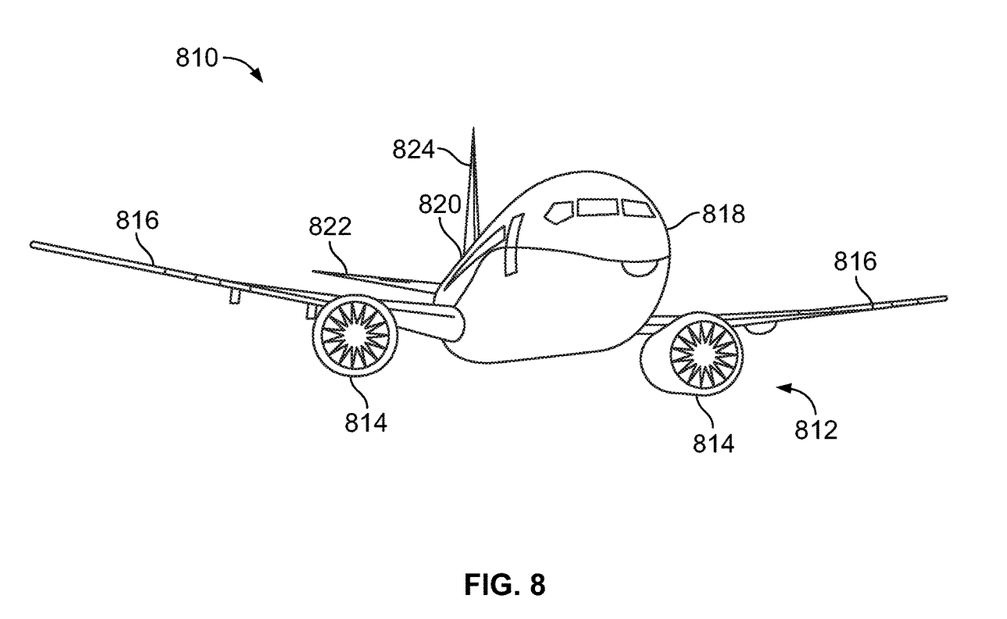
FIG. 8 illustrates a perspective front view of an aircraft, according to an embodiment of the present disclosure.

FIG. 8 illustrates a perspective front view of an aircraft 810, according to an embodiment of the present disclosure. The aircraft 810 is an example of a vehicle with which a virtual reality system may be utilized. The aircraft 810 includes a propulsion system 812 that may include two turbofan engines 814, for example. Optionally, the propulsion system 812 may include more engines 814 than shown. The engines 814 are carried by wings 816 of the aircraft 810. In other embodiments, the engines 814 may be carried by a fuselage 818 and/or an empennage 820. The empennage 820 may also support horizontal stabilizers 822 and a vertical stabilizer 824.

The fuselage 818 of the aircraft 810 defines an internal cabin (such as the cabin 102 shown in FIG. 1), which includes a cockpit, one or more work sections (for example, galleys, personnel carry-on baggage areas, and the like), one or more passenger sections (for example, first class, business class, and coach sections), and an aft section. Each of the sections may be separated by a cabin transition area, which may include one or more class/section divider assemblies, as described herein. The aircraft 810 may include or be used in conjunction with one or more virtual reality systems, such as shown and described with respect to FIGS. 1-7.

Alternatively, instead of an aircraft, embodiments of the present disclosure may be used with various other vehicles, such as automobiles, buses, locomotives and train cars, seacraft, spacecraft, and the like.

Figure 9A:
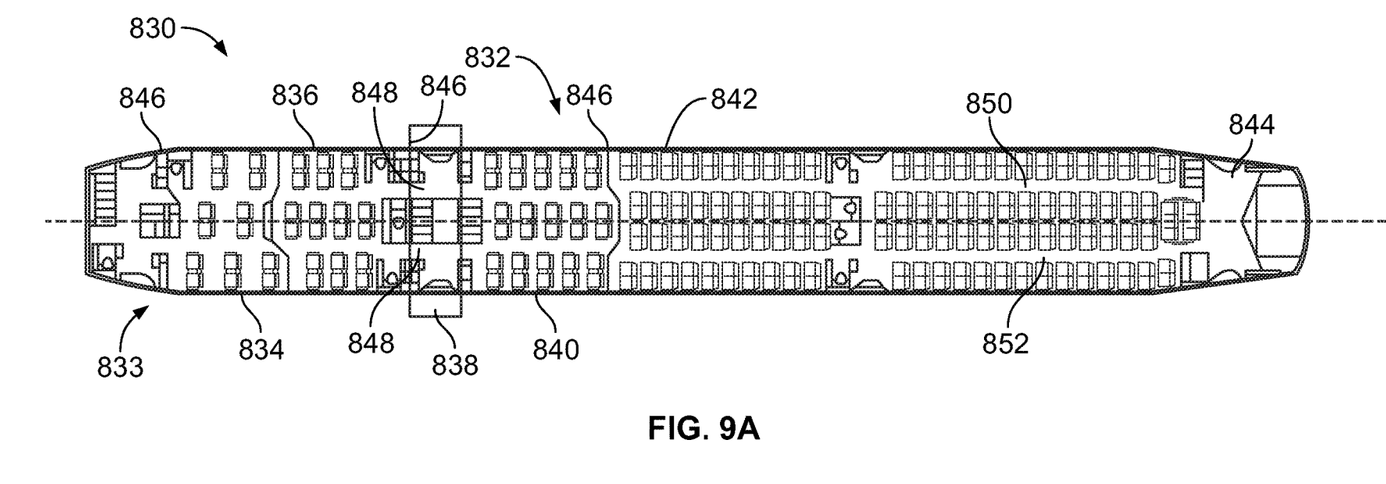
FIG. 9A illustrates a top plan view of an internal cabin of an aircraft, according to an embodiment of the present disclosure.

FIG. 9A illustrates a top plan view of an internal cabin 830 of an aircraft, according to an embodiment of the present disclosure. The internal cabin 830 may be within a fuselage 832 of the aircraft 810, shown in FIG. 8. For example, one or more fuselage walls may define the internal cabin 830. The internal cabin 830 includes multiple sections, including a front section 833, a first class section 834, a business class section 836, a front galley station 838, an expanded economy or coach section 840, a standard economy or coach section 842, and an aft section 844, which may include multiple lavatories and galley stations. It is to be understood that the internal cabin 830 may include more or less sections than shown. For example, the internal cabin 830 may not include a first class section, and may include more or less galley stations than shown. Each of the sections may be separated by a cabin transition area 846, which may include class/section divider assemblies between aisles 848.

As shown in FIG. 9A, the internal cabin 830 includes two aisles 850 and 852 that lead to the aft section 844. Optionally, the internal cabin 830 may have less or more aisles than shown. For example, the internal cabin 830 may include a single aisle that extends through the center of the internal cabin 830 that leads to the aft section 844. The internal cabin 830 may include or be used in conjunction with one or more virtual reality systems, such as shown and described with respect to FIGS. 1-7.

Figure 9B:
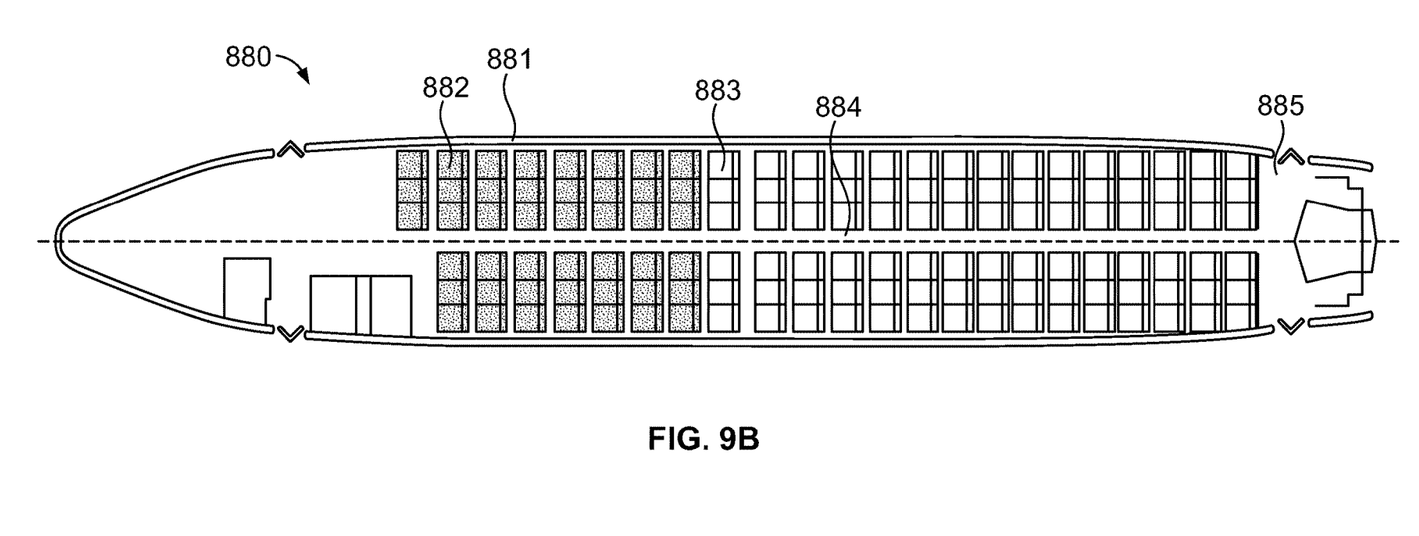
FIG. 9B illustrates a top plan view of an internal cabin of an aircraft, according to an embodiment of the present disclosure.

FIG. 9B illustrates a top plan view of an internal cabin 880 of an aircraft, according to an embodiment of the present disclosure. The internal cabin 880 may be within a fuselage 881 of the aircraft 810, shown in FIG. 4. For example, one or more fuselage walls may define the internal cabin 880. The internal cabin 880 includes multiple sections, including a main cabin 882 having passenger seats 883, and an aft section 885 behind the main cabin 882. It is to be understood that the internal cabin 880 may include more or less sections than shown.

The internal cabin 880 may include a single aisle 884 that leads to the aft section 885. The single aisle 884 may extend through the center of the internal cabin 880 that leads to the aft section 885. For example, the single aisle 884 may be coaxially aligned with a central longitudinal plane of the internal cabin 880. The internal cabin 880 may include or be used in conjunction with one or more virtual reality systems, such as shown and described with respect to FIGS. 1-7.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the spirit and scope of the present disclosure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A virtual reality system for use on-board a vehicle during a trip of the vehicle, the vehicle including a cabin, the system including:
a user input unit configured to receive user input from a user, the user input associated with a particular user;
a trip information input unit configured to acquire trip information corresponding to the trip;
a virtual reality display unit configured to provide a virtual reality display to the user; and
a processing unit coupled to the user input unit, the trip information input unit, and the display unit, the processing unit configured to:
acquire the user input from the user input unit,
acquire the trip information from the trip information input unit,
generate a virtual reality display using the user input and the trip information, the virtual reality display tailored for the particular user associated with the user input, wherein the virtual reality display is a mixed display comprising a digital portion and an environmental portion, the environmental portion depicting at least one structure within a field of view of the user corresponding to an environment within the cabin proximate to the particular user providing the user input, wherein the processing unit is configured to enlarge an apparent size of at least a portion of the environmental portion relative to the environment within the field of view, and
provide the virtual reality display to the particular user with the virtual reality display unit.

2. The virtual reality system of claim 1, wherein the processing unit is configured to enlarge an apparent size of the user's surroundings.

3. The virtual reality system of claim 1, wherein the trip information input unit is configured to acquire at least a portion of the trip information from a source disposed off-board of the vehicle.

4. The virtual reality system of claim 1, wherein the processing unit is configured to authenticate the particular user.

5. The virtual reality system of claim 1, wherein the processing unit is configured to generate a virtual assistant as part of the virtual reality display, the virtual assistant configured to provide interaction with the particular user.

6. The virtual reality system of claim 1, wherein the virtual reality display is configured for a crew member, the virtual reality display including a passenger information display corresponding to passenger inputs provided by corresponding passengers of the vehicle.

7. The virtual reality system of claim 1, wherein the digital portion further comprises a layout of a portion of an airport at which the user is scheduled to arrive, the processing unit further configured to display a route to be taken by the user through the airport superimposed on the layout of the portion of the airport.

8. The virtual reality system of claim 1, wherein the virtual reality display is configured for a crew member, the virtual reality display including passenger representations corresponding to passengers in the view of the crew member, the virtual reality display further including informational captions associated with the passengers in the view of the crew member, with each information caption corresponding to a particular passenger and including information about the particular passenger.

9. The virtual reality system of claim 8, wherein the information caption includes a passenger name and an associated order.

10. A method for displaying virtual reality content on-board a vehicle during a trip of the vehicle, the vehicle including a cabin, the method including:
acquiring user input from a user, the user input associated with a particular user;
acquiring trip information corresponding to the trip;
generating, with one or more processors, a virtual reality display using the user input and the trip information, the virtual reality display tailored for the particular used associated with the user input, wherein the virtual reality display is a mixed display comprising a digital portion and an environmental portion, the environmental portion depicting at least one structure within a field of view of the user corresponding to an environment within the cabin proximate to the particular user providing the user input, wherein generating the virtual reality display includes enlarging an apparent size of at least a portion of the environmental portion relative to the environment within the field of view, and
providing the virtual reality display to the particular user.

11. The method of claim 10, further comprising enlarging the apparent size of the user's surroundings.

12. The method of claim 10, further comprising acquiring at least a portion of the trip information from a source disposed off-board of the vehicle.

13. The method of claim 10, further comprising authenticating the particular user.

14. The method of claim 10, further comprising generating a virtual assistant as part of the virtual reality display, and interacting with the particular user with the virtual assistant.

15. The method of claim 10, further comprising displaying the virtual reality display to a crew member, the virtual reality display including a passenger information display corresponding to passenger inputs provided by corresponding passengers of the vehicle.

16. A tangible and non-transitory computer readable medium comprising one or more computer software modules configured to direct one or more processors to:
acquire user input associated with a particular user on-board a vehicle performing a trip;
acquire trip information corresponding to the trip;
generate a virtual reality display using the user input and the trip information, the virtual reality display tailored for the particular used associated with the user input, wherein the virtual reality display is a mixed display comprising a digital portion and an environmental portion, the environmental portion depicting at least one structure within a field of view of the user corresponding to an environment within the cabin proximate to the particular user providing the user input, wherein the processing unit is configured to enlarge an apparent size of at least a portion of the environmental portion relative to the environment within the field of view, and display the virtual reality display to the particular user.

17. The tangible and non-transitory computer readable medium of claim 16, wherein the one or more computer software modules are configured to direct the one or more processors to enlarge the apparent size of the user's surroundings.

18. The tangible and non-transitory computer readable medium of claim 16, wherein the one or more computer software modules are configured to direct the one or more processors to acquire at least a portion of the trip information from a source disposed off-board of the vehicle.

19. The tangible and non-transitory computer readable medium of claim 16, wherein the one or more computer software modules are configured to direct the one or more processors to authenticating the particular user.

20. The tangible and non-transitory computer readable medium of claim 16, wherein the one or more computer software modules are configured to direct the one or more processors to generating a virtual assistant as part of the virtual reality display, and to interact with the particular user with the virtual assistant.

\* \* \* \* \*